United States Patent
Maturo et al.

(10) Patent No.: US 10,049,788 B1
(45) Date of Patent: Aug. 14, 2018

(54) CONSTANT IMPEDANCE CONNECTOR SYSTEM FOR QUANTUM COMPUTER APPLICATIONS

(71) Applicant: The Phoenix Company of Chicago, Inc., Itasca, IL (US)

(72) Inventors: John E. Maturo, Thomaston, CT (US); Robert M. Bradley, Oakville, CT (US)

(73) Assignee: The Phoenix Company of Chicago, Inc., Itasca, IL (US)

( * ) Notice: Subject to any disclaimer, the term of this patent is extended or adjusted under 35 U.S.C. 154(b) by 0 days.

(21) Appl. No.: 15/608,168

(22) Filed: May 30, 2017

(51) Int. Cl.
*H01R 9/05* (2006.01)
*H01B 7/29* (2006.01)
*G06N 99/00* (2010.01)
*B82Y 10/00* (2011.01)

(52) U.S. Cl.
CPC ............... *H01B 7/29* (2013.01); *B82Y 10/00* (2013.01); *G06N 99/002* (2013.01)

(58) Field of Classification Search
CPC .......... H01B 7/29; B29B 13/025; H03H 7/40; H01R 24/50; H01R 13/514; H01R 13/506; H01R 13/6315; B82Y 10/00; G06N 99/002
USPC ........................................................ 439/578
See application file for complete search history.

(56) References Cited

U.S. PATENT DOCUMENTS

| | | | | |
|---|---|---|---|---|
| 5,055,068 A * | 10/1991 | Machura | ................ | H01R 24/50 439/581 |
| 5,360,330 A * | 11/1994 | Jensen | ................ | B29B 13/025 249/78 |
| 6,224,421 B1 * | 5/2001 | Maturo, Jr. | ........ | H01R 13/6315 439/247 |
| 6,595,801 B1 | 7/2003 | Leonard | | |
| 6,863,565 B1 | 3/2005 | Kogan | | |
| 6,905,367 B2 | 6/2005 | Crane | | |
| 7,029,286 B2 * | 4/2006 | Hall | ..................... | H01R 13/506 439/357 |
| 7,972,172 B2 * | 7/2011 | Huang | ................ | H01R 13/514 439/578 |
| 9,559,480 B2 | 1/2017 | Bradley et al. | | |
| 2001/0053228 A1 * | 12/2001 | Jones | ................ | G10K 11/1788 381/71.6 |
| 2014/0253259 A1 * | 9/2014 | Holland | ................ | H03H 7/40 333/100 |

* cited by examiner

*Primary Examiner* — Jean F Duverne
(74) *Attorney, Agent, or Firm* — DeLio, Peterson & Curcio, LLC; Robert Curcio

(57) ABSTRACT

A connection system for a quantum computer that employs constant impedance connectors with attenuation or filtering components or both embedded therein or within an adaptor removably insertable within an adaptor housing for use in a cryogenically cooled quantum computer. The connection system provides a higher density of cables traversing through a hermetic sealed top plate, and which are accessible to chill blocks to reduce the thermal energy from the signal lines. Attenuators or filter circuits are embedded in the constant impedance connector housings, or provided in adaptors that connect on each end to form mating constant impedance connections, in order to reduce signal strength as the signal progresses through the cryogenic environment and to remove extraneous electrical signal noise.

17 Claims, 7 Drawing Sheets

CONSTANT IMPEDANCE CONNECTOR SYSTEM FOR QUANTUM COMPUTER APPLICATIONS

BACKGROUND OF THE INVENTION

1. Field of the Invention

The present invention relates to computer technology, and specifically to the connection system for a quantum computer. More specifically, the present invention relates to a constant impedance connector system, utilizing the characteristics of known constant impedance connectors, some with embedded attenuation and/or filtering components, for use in a cryogenically cooled quantum computer, and some that are in the form of adapters having constant impedance connections.

2. Description of Related Art

Today's computer work by manipulating bits that exist in one of two states: a 0 or a 1. Quantum computers, however, are not limited to two states; they encode information as quantum bits, or qubits, which can exist in superposition. Qubits represent atoms, ions, photons, or electrons and their respective control devices that are working together to act as computer memory and/or a processor. Because a quantum computer can contain these multiple states simultaneously, it has the potential to be millions of times more powerful than today's most powerful supercomputers.

This superposition of qubits is what gives quantum computers their inherent parallelism. This parallelism allows a quantum computer to work on a million computations at once.

As the physical attributes of the qubits continue to advance, meeting the challenge of realizing a quantum machine requires the engineering of new hardware and control architectures with complexity far beyond today's systems. One such system advancement is the implementation of computing at cryogenic temperatures using superconductor-based components. There are many benefits of cryogenic operation, such as: increased mobility and saturation velocity of the carriers, leading to higher operation speed; lower noise levels; increased electrical conductivity; increased integration densities; and the suppression of thermally activated degradation processes, to name a few. The drawbacks of cryogenic operation include: the necessity for an appropriate cooling system; the selection of materials and components optimized for low temperature operation; and, interfacing aspects between "cold" and "warm" electronics, among others.

SUMMARY OF THE INVENTION

Bearing in mind the problems and deficiencies of the prior art, it is therefore an object of the present invention to provide a connection system capable of operating in a cryogenic environment with the ability to traverse through an external or "warm" environment to an internal or "cold" environment.

It is another object of the present invention to provide a connection system that presents a higher density of cables than the current state-of-the-art assemblies.

It is a further object of the present invention to accommodate system electrical attenuation in a cryogenic environment in order to reduce the thermal energy resulting from transmitted signal power.

It is another object of the present invention to establish a hermetic seal in-line with the system cabling.

It is another object of the present invention to provide a connection system that can be installed within a quantum computer operating system, and which can be easily assembled in the computer system without damage to the extremely small diameter center conductors of the cabling.

It is yet another object of the present invention to accommodate system electrical filtering in a cryogenic environment in order to reduce extraneous electrical signals (noise) coupled onto conductors.

The above and other objects, which will be apparent to those skilled in the art, are achieved in the present invention which is directed to a connection system for a computer for transmitting signal cables through tiered stages, comprising: a plurality of first signal cables each of the plurality of first signal cables having a center conductor terminated by a constant impedance receptacle connector or constant impedance plug connector; a first connector housing for securing each of the plurality of first signal cables; a hermetic header housing mounted to a first plate, the hermetic header housing having constant impedance receptacle connectors or constant impedance plug connectors mounted on a first side, and constant impedance plug connectors or constant impedance receptacle connectors mounted on a second side opposite the first side, and hermetic seals located between each of the hermetic header housing connectors on the first and second sides for hermetically sealing center conductors passing therethrough, wherein the hermetic header housing connectors on the first side are complementary connectors to the constant impedance receptacle connector or constant impedance plug connector of the constant impedance receptacle connector or constant impedance plug connector of the plurality of first signal cables, such that the first connector housing attaches to the hermetic header housing on the first side in a constant impedance cable connection; and a second connector housing having a plurality of second signal cables, each of the plurality of second signal cables having a center conductor terminated by a constant impedance receptacle connector or constant impedance plug connector, wherein the second connector housing plurality of second signal cable connectors are complementary connectors to the constant impedance receptacle connector or constant impedance plug connector of the hermetic header housing connectors on the second side, such that the second connector housing attaches to the hermetic header housing on the second side in a constant impedance cable connection.

The connection system may further include: a lower housing stage having an upper portion and a lower portion, the lower housing stage mounted to a second plate, the lower housing stage upper portion comprising a plurality of modified constant impedance connectors for mating with the plurality of second signal cables extending from the hermetic header housing on the second side, the modified constant impedance connectors each having an attenuator or filter component embedded therein for signal attenuation or electrical signal filtering, the lower housing stage lower portion including constant impedance connector receptacles or constant impedance plugs terminating with a plurality of third signal cables.

The second plate is a heat sink or a ground potential or both for the modified constant impedance connector attenuators or filters.

To facilitate attachment and removal, the lower housing stage upper portion and lower housing stage lower portion each include extended ribs for attachment to a clamp mounted to the second plate.

The modified constant impedance connector attenuators or filters may be press-fit into the lower housing stage upper portion or the lower housing stage lower portion.

The connection system may include: a plug housing block or a receptacle housing block for terminating the plurality of second signal cables, wherein the plug housing block includes a constant impedance plug connector for each of the plurality of second signal cables, or a constant impedance receptacle connector for each of the plurality of second signal cables, or some combination thereof; an adaptor housing having a plurality of apertures for mounting attenuator housings, filter housings, or both, each of the attenuator housings and/or filter housings associated with a signal cable of the plurality of second signal cables, and having a complementary constant impedance connector on a first side of the adaptor housing for connecting with the reciprocal constant impedance connector of plug housing block; and a receptacle housing block for connecting to the adaptor housing on a second side, the receptacle housing block including a constant impedance plug connector in electrical communication with the plurality of second signal cables, or a constant impedance receptacle connector in electrical communication with the plurality of second signal cables, or some combination thereof, and having a plurality of third signal cables extending therefrom; wherein the receptacle housing block connected to the adaptor housing on the adaptor housing second side, such that complementary constant impedance connectors of receptacle housing block connect to complementary constant impedance connectors of the adaptor housing second side.

The attenuator housing, the filter housing, or both, each include a resilient component for electrical communication, thermal communication, or both, to an inner wall of each respective aperture of the adaptor housing.

At least one additional plate for mounting a second lower housing stage may be included, the second lower housing stage comprising a second set of a plurality of modified constant impedance connectors in electrical communication with the plurality of third signal cables, the second set of modified constant impedance connectors each having a second attenuator or second filter component embedded therein for signal attenuation or electrical signal filtering.

Or, at least one additional plate may be included wherein a second plug housing block or a receptacle housing block is mounted to the at least one additional plate, in electrical communication with the third signal cables, wherein the plug housing block includes a constant impedance plug connector for each of the plurality of third signal cables, or a constant impedance receptacle connector for each of the plurality of third signal cables, or some combination thereof; a second adaptor housing having a plurality of apertures for mounting second attenuator housings, second filter housings, or both, each of the second attenuator housings and/or second filter housings associated with a signal cable of the plurality of third signal cables, and having a complementary constant impedance connector on a first side of the second adaptor housing for connecting with the reciprocal constant impedance connector of second plug housing block; and a second receptacle housing block for connecting to the second adaptor housing on a second side, the second receptacle housing block including a constant impedance plug connector in electrical communication with the plurality of third signal cables, or a constant impedance receptacle connector in electrical communication with the plurality of third signal cables, or some combination thereof, and having a plurality of fourth signal cables extending therefrom; wherein the second receptacle housing block is connected to the second adaptor housing on the second adaptor housing second side, such that complementary constant impedance connectors of the second receptacle housing block connect to complementary constant impedance connectors of the second adaptor housing second side.

The connection system constant impedance connectors may comprise non-magnetic material.

The first and second attenuators or filters are in a casing, the casing being secured within an internal cavity of the modified constant impedance connector housing.

The plurality of second signal cables or the plurality of third signal cables, or both, comprise superconducting cabling material.

In a second aspect, the present invention is directed to a constant impedance connector for electrical attenuation or electrical filtering of electrical signals in a connection system comprising: a first housing portion having a constant impedance receptacle or plug mating end with a first center conductor; a second housing portion having a constant impedance plug or receptacle mating end with a second center conductor, the second housing portion removably attachable to the first housing portion; wherein the first housing portion, the second housing portion, or both, form an internal cavity for securing an attenuator or filter component embedded therein, the attenuator or filter component for attenuating or filtering an electrical signal on the first and second center conductor.

In a third aspect, the present invention is directed to an adaptor for implementing an attenuator or a filter into a constant impedance signal cable, the adaptor comprising an attenuator component or a filter component within an adaptor housing, the adaptor housing terminating on each end with a constant impedance receptacle or constant impedance plug.

The adaptor may include a resilient component in mechanical, electrical, and/or thermal communication with the adaptor' housing on one side, and in mechanical, electrical, and/or thermal communication with an adaptor housing mounting structure on the other side, such that the resilient component in connection with the adaptor housing mounting structure provides a heat sink, a ground potential, or both for signals traversing through the adaptor.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-7 of the drawings in which like numerals refer to like features of the invention.

The present invention provides a connection system to accommodate computer architecture, and preferably quantum computer architecture. In one embodiment, the present invention lends itself to operation in a cryogenically cooled environment, although the present invention is not limited to cryogenically cooled environment applications. The need for reducing input power that would otherwise provide degrading thermal effects to the internal system is mitigated through the introduction of attenuators embedded within the housing of specialized constant impedance connectors, or formed as adapters that are designed to extend a constant impedance connection. In both instances the connectors are designed with a direct thermal connection to heat sinking elements, such as refrigeration plates, or the like. In certain instances, the attenuators are cryogenically-design. Similarly, in lieu of, or in addition to, attenuators, the present invention may also accommodate filters that are either embedded within the housing of specialized constant impedance connectors or attached as adapters to extend the constant impedance connections.

The design for embedding attenuators or providing an attenuating adaptor that extends a constant impedance connector readily lends itself to the implementation of filtering components within the connector or adaptor housing to reduce unwarranted coupling on the signal lines. In this manner, extraneous power on the line is further reduced by shunting at least a portion of the electrically coupled noise to ground before it travels to the colder portions of the cryogenically cooled environment.

Standardized constant impedance connectors accommodate large radial and axial misalignment tolerances found in modular applications. Constant impedance technology, as that found in the PkZ® connectors of Palco Connector, Inc., of Naugatuck, Conn.—an affiliate of The Phoenix Company of Chicago—ensures constant impedance with low insertion forces and no internal engagement spring. These connectors provide consistent performance by maintaining constant impedance over the larger Z-axis mating gaps caused by system and connector tolerance challenges. This is advantageous over the SMA connectors of the prior art, which are generally threaded and unable to accommodate movement of components at low temperatures. The Palco PkZ® connectors are implemented in this design as exemplary constant impedance connectors that will maintain signal integrity in a challenging environment.

The operating signals may be either RF or digital signals, typically in frequencies less than 40 GHz, but may be as high as 40 GHz to 60 GHz, with approximately 1 watt max power. This is in contrast to SMA connectors currently found in the art, which operate on the order of less than 20 GHz.

Figure 1:
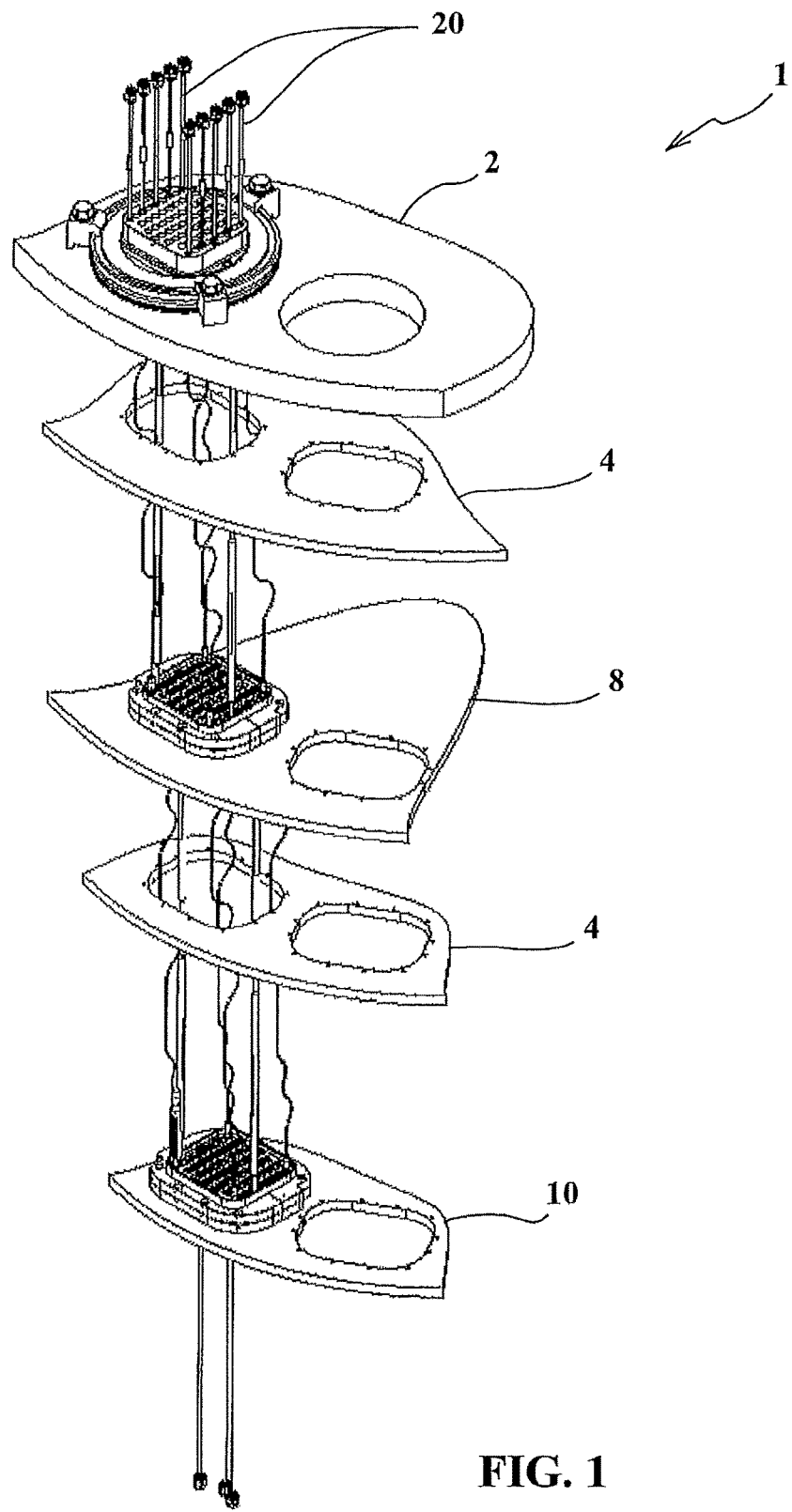
FIG. 1 is a perspective view of one embodiment of the connector system of the present invention.

FIG. 1 is a perspective view of one embodiment of the connector system 1 of the present invention. The input signals travel through connector system 1 via mounting and connecting blocks with cables extending there between. Top plate 2 receives input cables 20 from an external, uncontrolled or less controlled environment, such as a less controlled temperature environment. The center conductors of the cables pass through top plate 2 in a manner that secures and maintains a heimetic seal. After traversing through top plate 2, the signals are carried via cabling through at least one additional plate 4, which may be a plate used for heat sinking, and more preferably, a plurality of plates, to reduce and maintain a lower temperature for cryogenic applications. Such plates act as heat sinks for thermal energy, which aid in prohibiting the thermal energy from transmitting further down the connector system. The signals are then connected via cabling to a lower housing stage 8 which is downstream of the top plate 2, and which utilizes a modified constant impedance connector, such as a PkZ® connector. The signal lines then traverse to a bottom housing stage 10 through which the signal lines then progress to the internal computer electronics.

Figure 4:
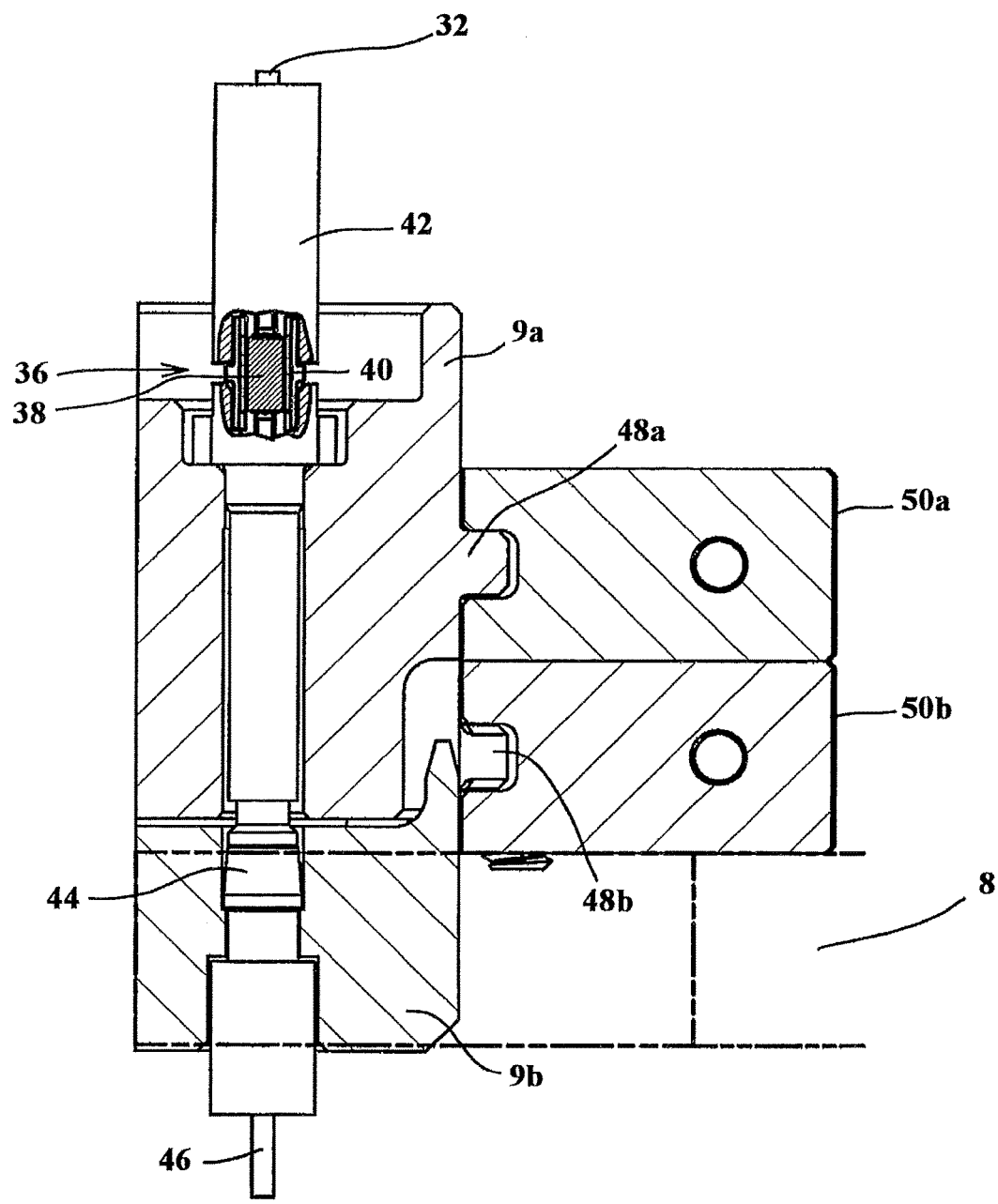
FIG. 4 depicts the center stage of the connector system where signal attenuation is achieved.

As will be discussed in further detail below, the modification of the constant impedance connection may be presented in different distinct designs and at different stages. For example, in a first embodiment, an attenuator or filter is embedded in either a constant impedance connector receptacle or plug. As depicted in FIG. 4, the connector receptacle is installed into a receptacle housing block 9a, and the connector plug is installed into a plug housing block 9b, such that when the receptacle housing block 9a is mated to the plug housing block 9b, the receptacle and plug connectors are mated as well. This allows for proper alignment of the contacts and thermal dissipation through the housing blocks.

In a second embodiment an attenuator component or filter component adaptor is employed within its own adapter body which is then mounted into an adaptor housing, which preferably accommodates a plurality of adaptor bodies. The adaptor housing is then mounted to a plate, such as a refrigeration plate. The adaptor housing will receive on one side connectors from a receptacle housing block, and on the other side connectors from a plug housing block. It is also possible for an adaptor housing to be designed to receive connectors from a receptacle housing block on both sides, or connectors from a plug housing block on both sides, such that, in either embodiment, a constant impedance connection is made on each side of the adaptor housing.

The attenuator lowers the power on each center conductor without changing the signal integrity. In cooling applications, the excess thermal energy from the attenuated signals is then dissipated through the housing to a heat sink, such as refrigeration plate. The system is designed to accommodate a plurality of such heat sinks. Additional plates may have further attenuation components for further signal conditioning. External cabling then extends from bottom housing stage 10 to the computer internal electronics, and ultimately to the processor.

It is noted that for optimum operation of the connection system within a quantum computer application most or approximately all of the materials of the connection system are designed of non-magnetic material. For other applications, non-magnetic material may not be necessitated.

Figure 2:
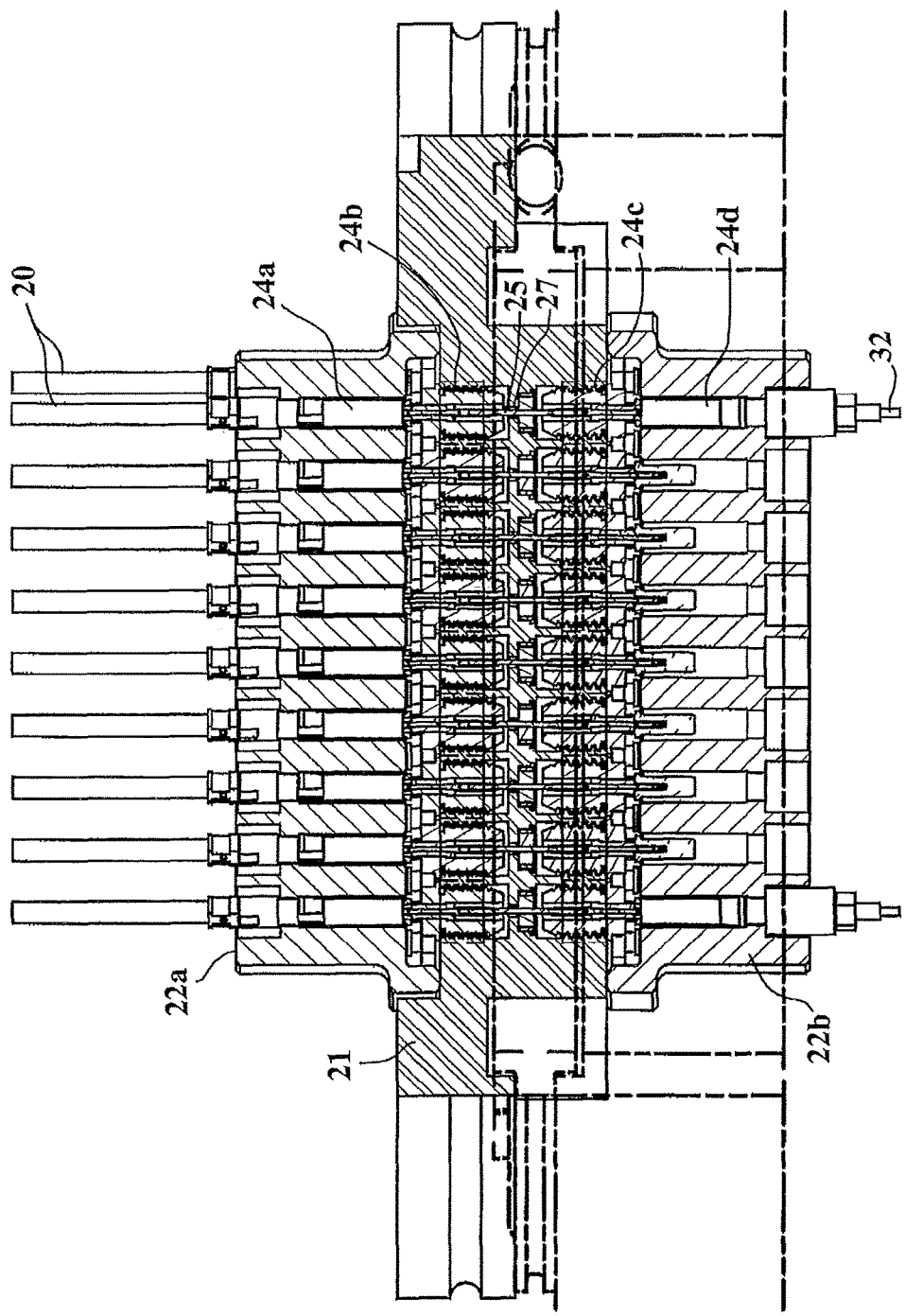
FIG. 2 is a cross-sectional view of the top plate of the connector system of FIG. 1 with a hermetic header housing attached thereto.

FIG. 2 is a cross-sectional view of top plate 2 of connector system 1 with a hermetic header housing 21. Top plate 2 introduces a hermetic seal in the signal lines. This is accomplished by mounting hermitic header housing 21 on top plate 2. Heinietic header housing 21 passes through an aperture in top plate 2. In this manner, downstream signal cables and electronics are sealed from the outside environment. In this embodiment, on one side of top plate 2, incoming cables 20 are attached to a connector housing 22a. Connector housing 22a terminates the signal cables at a constant impedance receptacle connector 24a. Alternatively, the signal cables may be terminated at a constant impedance plug connector, as receptacles and plugs may be interchanged without loss of design function. The connector housing 22a then connects to the top side of the hermetic header housing 21. The hermetic header housing 21 on its top side has reciprocal constant impedance plugs 24b for mating with the constant impedance receptacles 24a of connector housing 22a. The center conductor 25 runs through a hermetic seal material 27 within the hermetic header housing 21. On the bottom side of top plate 2, which correlates with the bottom side of hermetic header housing 21, a constant impedance plug 24c is installed for each signal line. A connector housing 22b then connects to the bottom side of the hermetic header housing 21. Connector housing 22b has reciprocal constant impedance receptacle connectors 24d to mate with constant impedance plugs 24c.

Figure 3:
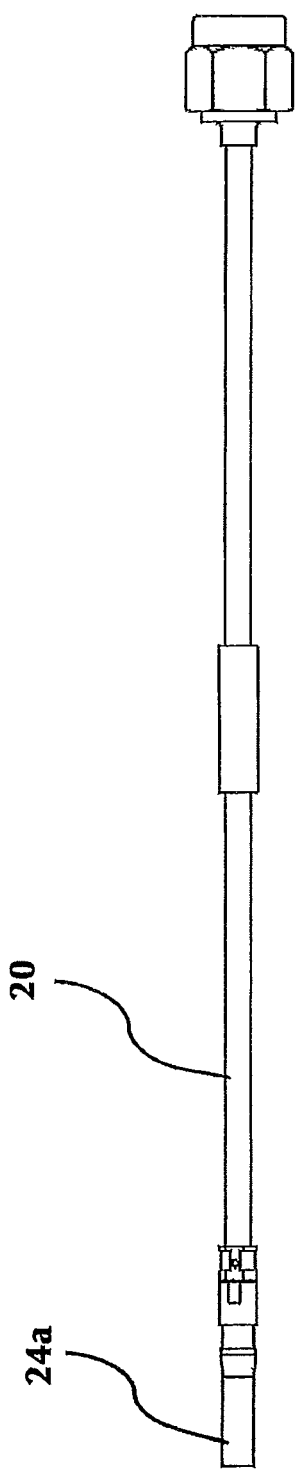
FIG. 3 depicts an illustrative example of an incoming cable with a connector housing for connection to the top plate of FIG. 2.

FIG. 3 depicts an illustrative embodiment of incoming cable 20 for installation into connector housing 22. A first, standard constant impedance receptacle 24a is attached thereto. The standard PkZ® receptacle is preferably a commercially available type constant impedance connector, such as that available from Palco Connector, Inc., or an equivalent thereof. It should be noted that where receptacles are utilized, plug connectors may be employed, and where plug connectors are utilized, receptacle connectors may be employed, without degradation to the constant impedance connection.

As will be discussed in further detail below, in an alternative embodiment, a second constant impedance mating plug may be introduced, which is mated with a second constant impedance receptacle. The second receptacle is altered from the first receptacle discussed above insomuch as the second receptacle requires a different internal termination to accommodate a different cable, allowing the connection to proceed from a generally standard cabling material to cabling 32, which may be superconducting cabling material. In this manner, different cabling may be used under a similar connection scheme.

Figure 6:
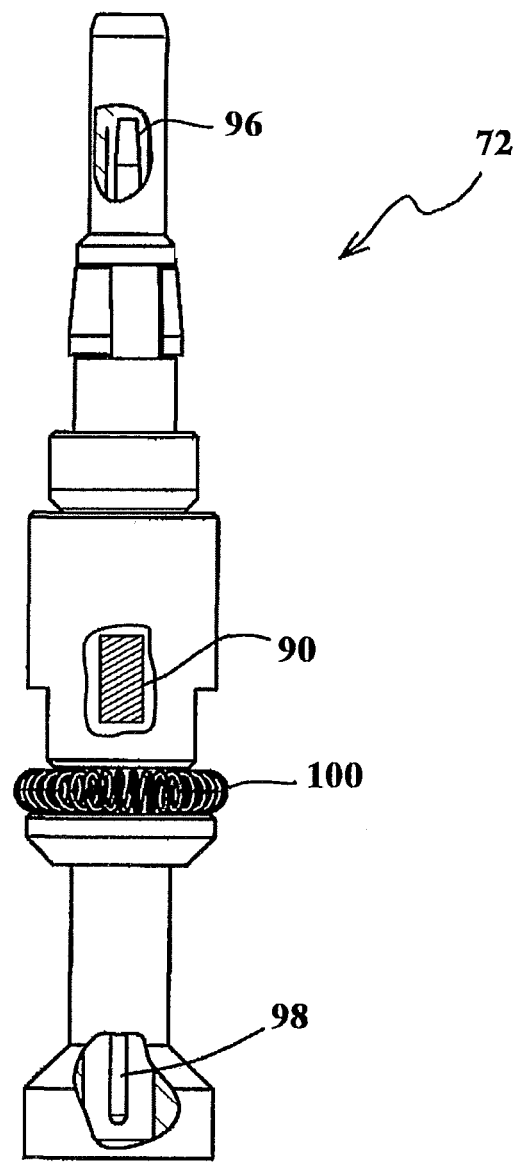
FIG. 6 depicts a cross-sectional view of the attenuator or filter component insertable within the adaptor housing of FIG. 5.

Following the signal cabling from the external environment towards the cryogenically cooled environment, through the hermetic seal stage, the cabling extends from connector housing 22b to lower housing stage 8. FIG. 6 depicts a cross-sectional view of a portion of lower housing stage 8. In this embodiment, the attenuator of the constant impedance connector is press-fitted within the receptacle housing 9a, and is thus not interchangeable or easily repairable. As will be shown in a second embodiment, an attenuator or filter adaptor is interchangeable, and would connect on each end to a respective constant impedance receptacle or plug.

In FIG. 4, receptacle housing block 9a performs an attenuation of the cable signals utilizing an embedded attenuator 38. Cabling 32 includes a constant impedance (PkZ®) receptacle 36. PkZ® receptacle 36 is modified to include, internally, attenuator 38. Attenuator 38 may be formed from discrete attenuator electronic components. Other attenuator components may be employed, provided their dimensions are acceptable for insertion within a modified constant impedance connector housing, such as PkZ® connector housing 42. Attenuator 38 may be any level of attenuation depending upon the system requirements. In one embodiment, a 20 dB attenuator is employed. Attenuator 38 is confined within an attenuator housing 40, which is secured within the modified PkZ® receptacle 36.

By attenuating the cable signals, energy is removed from the cables and shunted via the attenuator to the adjoining plate. In this manner, heat energy is kept further away from the internal computer electronics downstream.

Constant impedance receptacle 36 is then mated to a mating plug 44 which is inserted within, and secured by, mating plug housing block 9b. Mating plug 44 extends the signal conductor to a cable 46, which under certain circumstances may be a superconducting cable. Cable 46 does not necessarily have to be the same material as cable 32, and any mating plug would be designed to accommodate the different conducting cable material, including superconducting cabling material.

Receptacle and plug housing blocks 9a, 9b are attached to, and in thermal communication with, lower housing stage 8 via a specialized clamp 50a,b. Clamp 50a,b are each designed to hold extended ribs 48a,b on the perimeter of each housing block 9a,b respectively. Clamps 50a,b are mechanically fastened to lower housing stage 8 on one side via a threaded or other removable attachment scheme. The bottom side of clamp 50b is in thermal communication with lower housing stage 8.

Cables 46 extend from plug housing block 9b and may traverse through one or more plates that may utilize heat sinks, and which may be configured in the same manner as described above.

Figure 5:
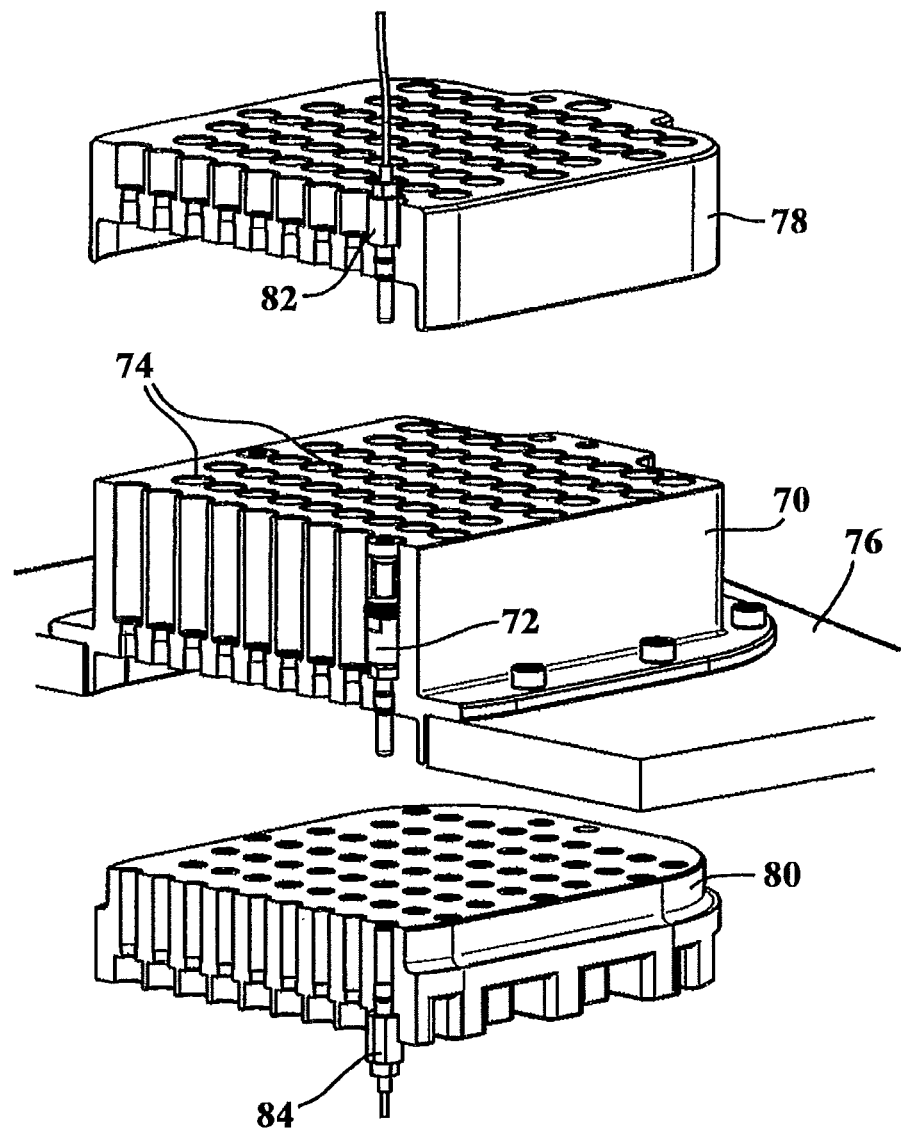
FIG. 5 depicts an exploded, perspective view of an adaptor housing that encloses a plurality of attenuator or filter components, each within respective apertures.

FIG. 5 depicts an exploded, perspective view of an adaptor housing 70 that encloses a plurality of attenuator or filter components 72, each within respective apertures 74, which for illustrative purposes shall be shown as cylindrical apertures although the present invention is not restricted to any given shape. Adaptor housing 70 is attached to plate 76, which is preferably a heat sink plate or a metal structure that provides either thermal conduction for transmitting heat energy, or ground potential for removing filtered signal noise, or both. A plug housing block 78 attaches to adaptor housing 70 on one side, and a receptacle housing block 80 attaches to adaptor housing 70 on the other side. The plug and receptacle housing blocks 78, 80 each house a mating section of a constant impedance connector, either the receptacle or the plug portion component 82, 84, respectively, for cable connection to the adaptor housing 70 on each side, respectively.

In this manner, one end of the receptacle or plug portion component 82, 84 is a mating constant impedance connector receptacle or plug, which is designed to mate with the complementary attenuator or filter component 72, such that a constant impedance connection is formed. The mating attachment is slidably connected to the receiving attachment on the attenuator or filter component 72. By this design, the attenuator or filter components 72 may be interchangeable, insomuch as attenuator components may be replaced with filter components, and vice versa. As an illustrative example, plug housing block 78 is depicted with a PkZ® plug, and receptacle housing block 80 is depicted with a PkZ® receptacle. The present invention can also accommodate the interchanging of plugs and receptacles so that the constant impedance connection is still maintained.

FIG. 6 depicts a partial cross-sectional view of the attenuator or filter component 72. This component includes an attenuator or filter circuit contained in its own removable casing 90 with electrical connections 96, 98 at each end.

This attenuator or filter component 72 is insertable within aperture 74 of adaptor housing 70.

A resilient, thermally and/or electrically conductive component 100 is attached to the outside of attenuator or filter component 72 to transmit thermal energy from the attenuator or filter component 72 to the inner wall of aperture 74 upon insertion. The resilient thermally or electrically conductive component 100 may be in the form of a spring or other resilient structure for forming a slideable, compressible connection against the inner wall of aperture 74. The resilient component 100 provides movement and flexibility that a press-fit device (as depicted by the first embodiment above) cannot provide, while assuring improved thermal conductivity.

Figure 7:
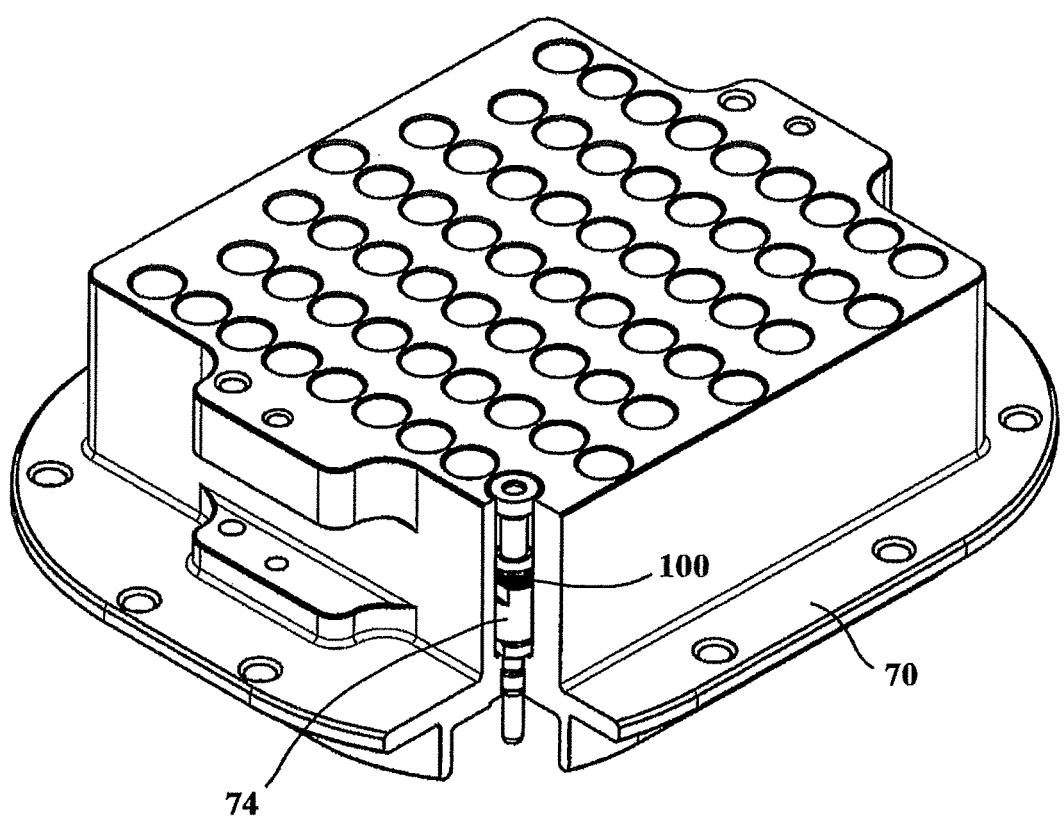
FIG. 7 depicts an exploded, perspective view of the adaptor housing of FIG. 5, where a section of the aperture is shown removed to expose the attenuator or filter component inserted therein

FIG. 7 depicts an exploded, perspective view of adaptor housing 70 where a section of the aperture 74 is shown removed to expose the attenuator or filter component 72 inserted therein. As shown, resilient component 100 is circumferentially attached to attenuator or filter component 72 such that the outermost side of component 72 is compressibly fit against the inner wall of aperture 74.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A connection system for a computer for transmitting signal cables through tiered stages, comprising:
    a plurality of first signal cables each of said plurality of first signal cables having a center conductor terminated by a constant impedance receptacle connector or constant impedance plug connector;
    a first connector housing for securing each of said plurality of first signal cables;
    a hermetic header housing mounted to a first plate, said hermetic header housing having constant impedance receptacle connectors or constant impedance plug connectors mounted on a first side, and constant impedance plug connectors or constant impedance receptacle connectors mounted on a second side opposite said first side, and hermetic seals located between each of said hermetic header housing connectors on said first and second sides for hermetically sealing center conductors passing therethrough, wherein said hermetic header housing connectors on said first side are complementary connectors to said constant impedance receptacle connector or constant impedance plug connector of said constant impedance receptacle connector or constant impedance plug connector of said plurality of first signal cables, such that said first connector housing attaches to said hermetic header housing on said first side in a constant impedance cable connection; and
    a second connector housing having a plurality of second signal cables, each of said plurality of second signal cables having a center conductor terminated by a constant impedance receptacle connector or constant impedance plug connector, wherein said second connector housing plurality of second signal cable connectors are complementary connectors to said constant impedance receptacle connector or constant impedance plug connector of said hermetic header housing connectors on said second side, such that said second connector housing attaches to said hermetic header housing on said second side in a constant impedance cable connection.

2. The connection system of claim 1 including:
    a lower housing stage having an upper portion and a lower portion, said lower housing stage mounted to a second plate, said lower housing stage upper portion comprising a plurality of modified constant impedance connectors for mating with said plurality of second signal cables extending from said hermetic header housing on said second side, said modified constant impedance connectors each having an attenuator or filter component embedded therein for signal attenuation or electrical signal filtering, said lower housing stage lower portion including constant impedance connector receptacles or constant impedance plugs terminating with a plurality of third signal cables.

3. The connection system of claim 2 wherein said second plate is a heat sink or a ground potential or both for said modified constant impedance connector attenuators or filters.

4. The connection system of claim 3 wherein said second plate is a refrigeration plate.

5. The connection system of claim 3 wherein said lower housing stage upper portion and lower housing stage lower portion each include extended ribs for attachment to a clamp mounted to said second plate.

6. The connection system of claim 2 wherein said modified constant impedance connector attenuators or filters are press-fit into said lower housing stage upper portion or said lower housing stage lower portion.

7. The connection system of claim 1 including:
    a plug housing block or a receptacle housing block for terminating said plurality of second signal cables, wherein said plug housing block includes a constant impedance plug connector for each of said plurality of second signal cables, or a constant impedance receptacle connector for each of said plurality of second signal cables, or some combination thereof;
    an adaptor housing having a plurality of apertures for mounting attenuator housings, filter housings, or both, each of said attenuator housings and/or filter housings associated with a signal cable of said plurality of second signal cables, and having a complementary constant impedance connector on a first side of said adaptor housing for connecting with said reciprocal constant impedance connector of plug housing block; and
    a receptacle housing block for connecting to said adaptor housing on a second side, said receptacle housing block including a constant impedance plug connector in electrical communication with said plurality of second signal cables, or a constant impedance receptacle connector in electrical communication with said plurality of second signal cables, or some combination thereof, and having a plurality of third signal cables extending therefrom;
    wherein said receptacle housing block connected to said adaptor housing on said adaptor housing second side, such that complementary constant impedance connectors of receptacle housing block connect to complementary constant impedance connectors of said adaptor housing second side.

8. The connection system of claim 7 wherein said attenuator housing, said filter housing, or both, each include a resilient component for electrical communication, thermal communication, or both, to an inner wall of each respective aperture of said adaptor housing.

9. The connection system of claim 2 including at least one additional plate for mounting a second lower housing stage, said second lower housing stage comprising a second set of a plurality of modified constant impedance connectors in electrical communication with said plurality of third signal cables, said second set of modified constant impedance connectors each having a second attenuator or second filter component embedded therein for signal attenuation or electrical signal filtering.

10. The connection system of claim 7 including:
an additional plate;
a second plug housing block or a receptacle housing block mounted to said at least one additional plate, in electrical communication with said third signal cables, wherein said plug housing block includes a constant impedance plug connector for each of said plurality of third signal cables, or a constant impedance receptacle connector for each of said plurality of third signal cables, or some combination thereof;
a second adaptor housing having a plurality of apertures for mounting second attenuator housings, second filter housings, or both, each of said second attenuator housings and/or second filter housings associated with a signal cable of said plurality of third signal cables, and having a complementary constant impedance connector on a first side of said second adaptor housing for connecting with said reciprocal constant impedance connector of second plug housing block; and
a second receptacle housing block for connecting to said second adaptor housing on a second side, said second receptacle housing block including a constant impedance plug connector in electrical communication with said plurality of third signal cables, or a constant impedance receptacle connector in electrical communication with said plurality of third signal cables, or some combination thereof, and having a plurality of fourth signal cables extending therefrom;
wherein said second receptacle housing block is connected to said second adaptor housing on said second adaptor housing second side, such that complementary constant impedance connectors of said second receptacle housing block connect to complementary constant impedance connectors of said second adaptor housing second side.

11. The connection system of claim 2 wherein said attenuator provides up to 40 dB attenuation.

12. The connection system of claim 9 wherein said second attenuator provides less than 40 dB attenuation.

13. The connection system of claim 1 wherein said constant impedance connectors comprise non-magnetic material.

14. The connection system of claim 1 wherein said constant impedance receptacle connector includes a stabilizing bobbin around the center conductor to facilitate matched impedance.

15. The connection system of claim 2 wherein said first and second attenuators or filters are in a casing, said casing being secured within an internal cavity of said modified constant impedance connector housing.

16. The connection system of claim 2 wherein said plurality of second signal cables or said plurality of third signal cables, or both, comprise superconducting cabling material.

17. The connection system of claim 7 wherein said plurality of second signal cables or said plurality of third signal cables, or both, comprise superconducting cabling material.

* * * * *